Jan. 25, 1966        J. R. GELZER        3,230,607
METHOD OF ASSEMBLING AND CALIBRATING A THERMOSTATIC SWITCH
Filed July 13, 1961        4 Sheets-Sheet 1
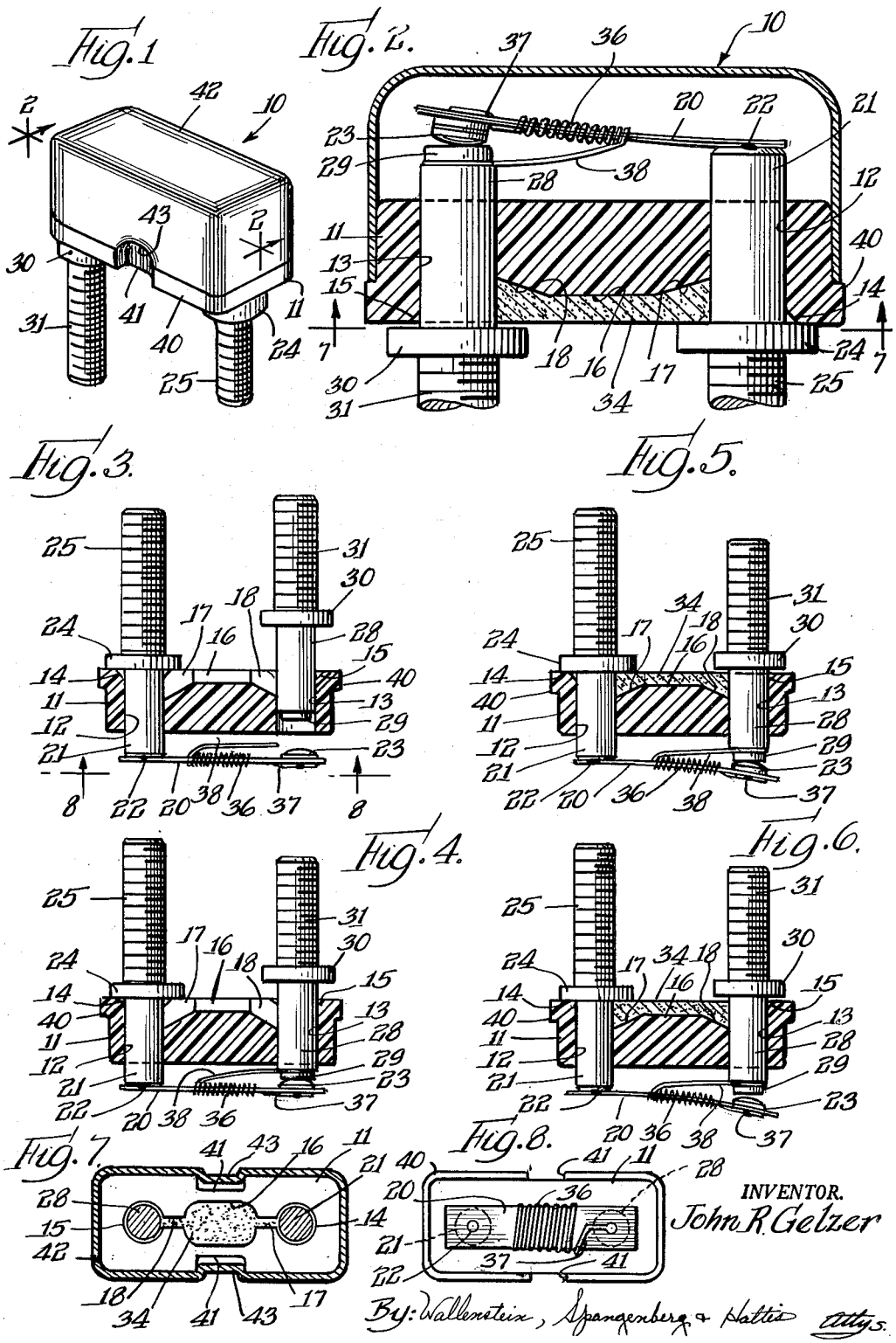
INVENTOR.
John R. Gelzer
By: Wallenstein, Spangenberg & Hattis Attys.

Jan. 25, 1966    J. R. GELZER    3,230,607
METHOD OF ASSEMBLING AND CALIBRATING A THERMOSTATIC SWITCH
Filed July 13, 1961    4 Sheets-Sheet 2
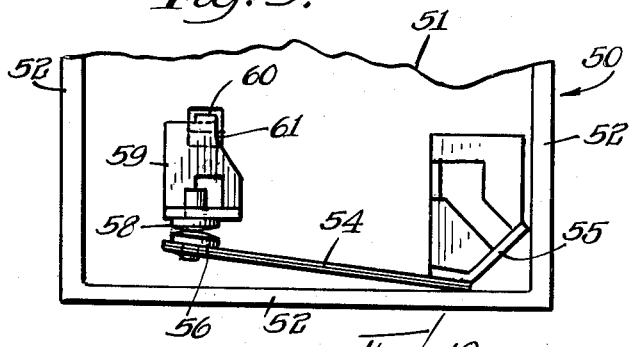
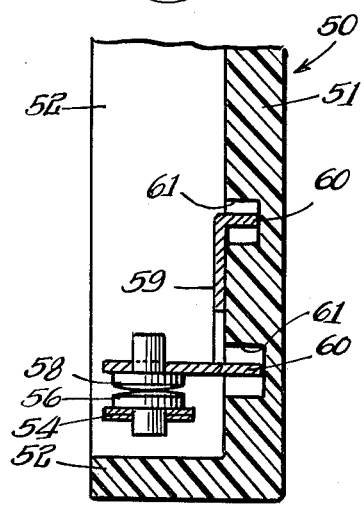
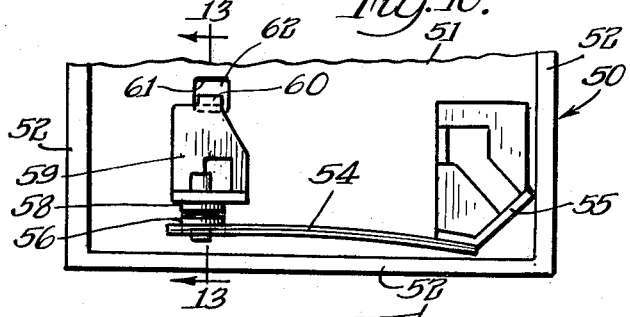
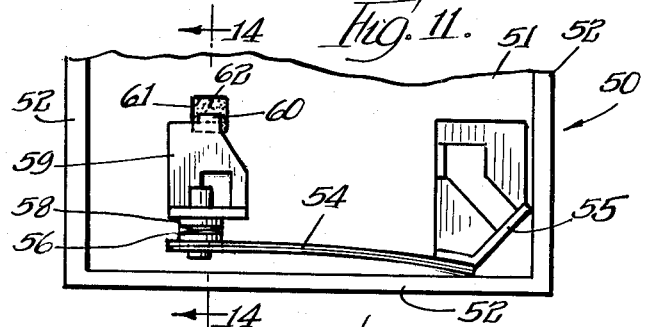
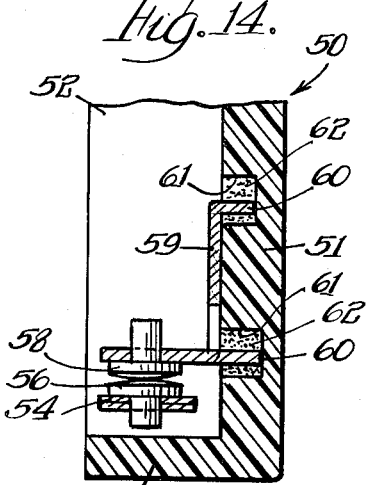
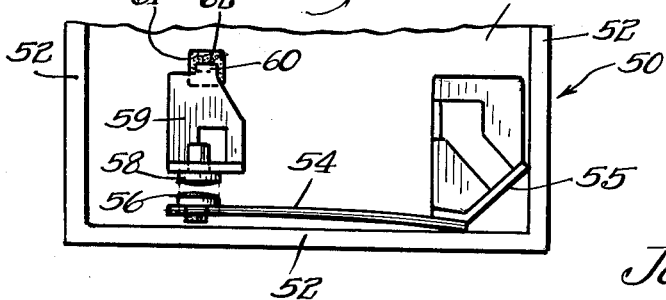
INVENTOR.
John R. Gelzer
BY Wallenstein, Spangenberg
+ Hattis
Attys

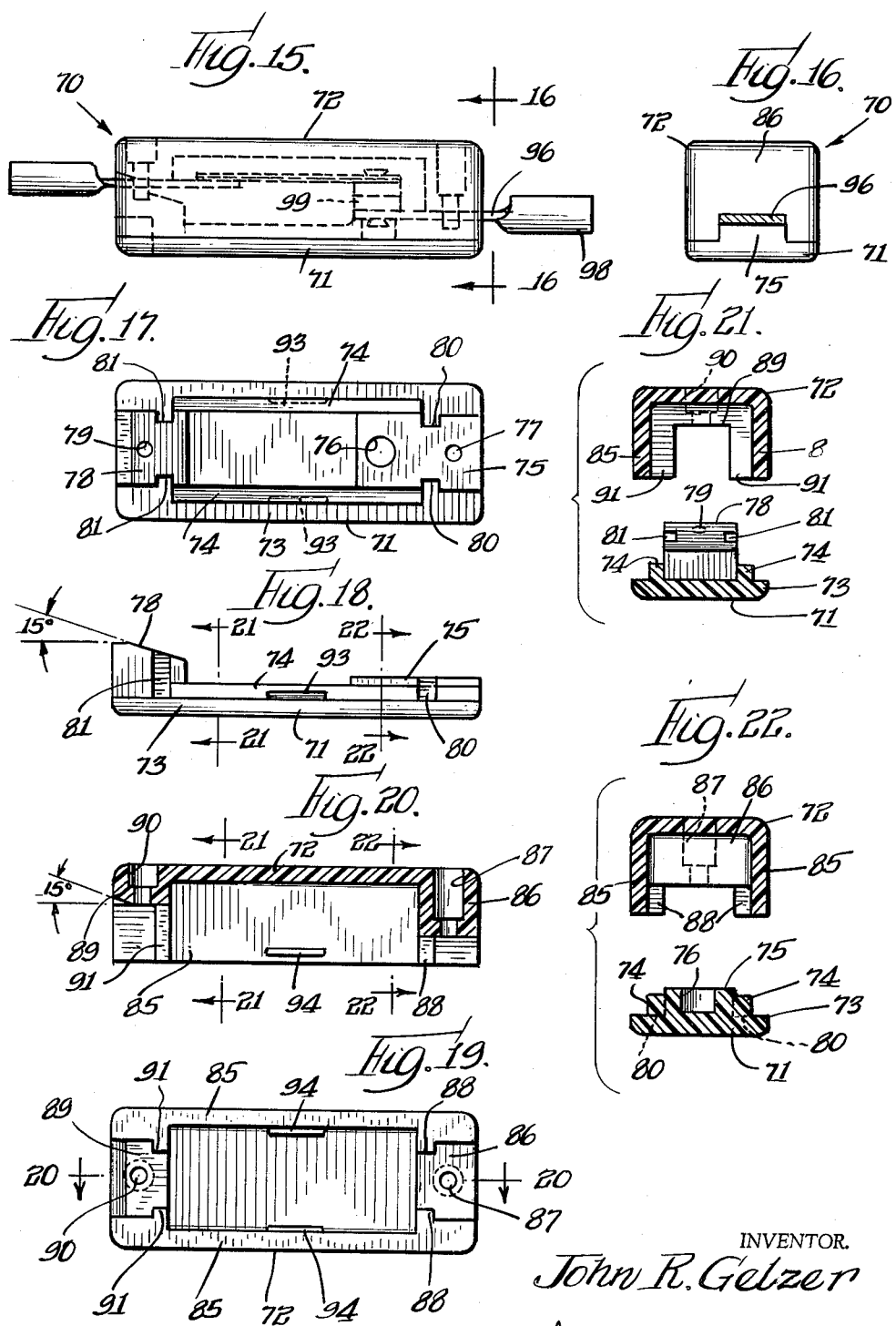

Jan. 25, 1966  J. R. GELZER  3,230,607
METHOD OF ASSEMBLING AND CALIBRATING A THERMOSTATIC SWITCH
Filed July 13, 1961  4 Sheets-Sheet 4
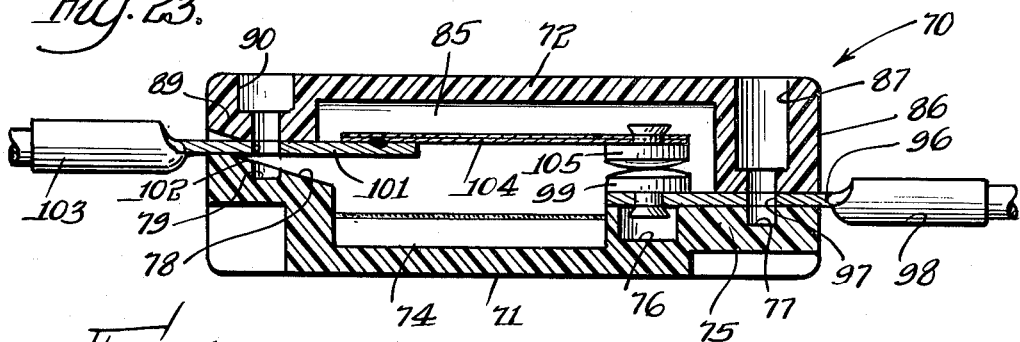
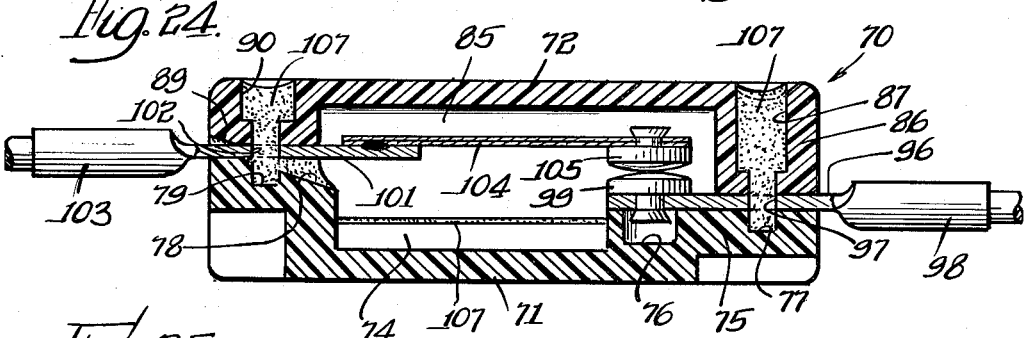
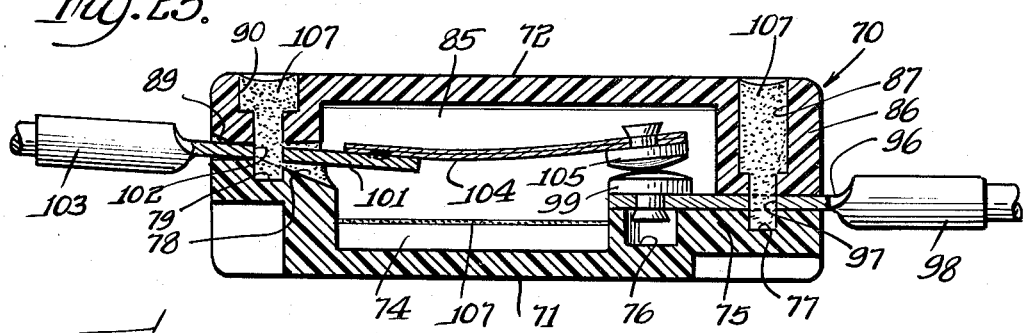
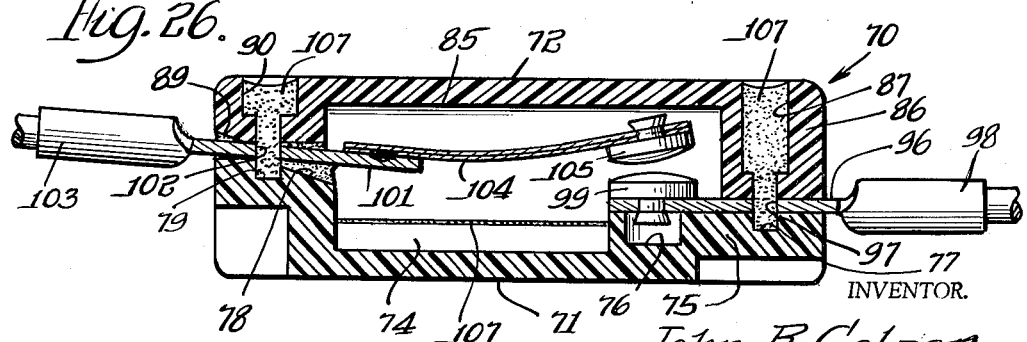
INVENTOR.
John R. Gelzer
By: Wallenstein, Spangenberg & Hattis
Attys.

United States Patent Office 3,230,607
Patented Jan. 25, 1966

3,230,607
METHOD OF ASSEMBLING AND CALIBRATING A THERMOSTATIC SWITCH
John R. Gelzer, Barrington, Ill., assignor to Littelfuse, Incorporated, Des Plaines, Ill., a corporation of Illinois
Filed July 13, 1961, Ser. No. 123,709
2 Claims. (Cl. 29—155.5)

The principal object of this invention is to provide an improved thermostatic switch and an improved method for assembling and calibrating the same, wherein the thermostatic switch includes an insulating base, a contact member carried by the base and provided with a stationary contact, and a thermostatic member carried by the base and provided with a movable contact which engages the stationary contact at a predetermined temperature value of the thermostatic member, and wherein the thermostatic switch is automatically calibrated during the assembly thereof.

Briefly, in accordance with this invention, the thermostatic member and the contact member are mounted in the base, one of the members being fixedly mounted and the other member being freely movably mounted and being urged into engagement wtih the other member. The thermostatic member is then brought to substantially said predetermined temperature value for flexing the same and hence automatically correspondingly adjustably positioning the freely movable member in the base. Then, at substantially said predetermined temperature value, the freely movable member is fixedly secured in its automatically adjusted position in the base, as by means of, for example, a cement, such as an epoxy cement or the like. In this respect, the cement is one which does not interfere with the free movement of the movable member while it is so being automatically moved to its adjusted position and which will harden at substantially said predetermined temperature value for fixedly bonding said freely movable member in its adjusted position in the base.

In two of the forms of the invention disclosed herein, it is the thermostatic member which is fixedly mounted in the base and it is the contact member which is freely movably mounted and automatically adjusted and fixedly secured in the base. In the other form of the invention disclosed herein, it is the contact member which is fixedly mounted in the base and it is the thermostatic member which is freely movably mounted and automatically adjusted and fixedly secured in the base. In both instances, the manners of assembling and calibrating the thermostatic switches are substantially the same.

Further objects of this invention reside in the details of construction of the thermostatic switch and in the steps for assembling and calibrating the same.

While the thermostatic switch and the method of assembling and calibrating the same in accordance with this invention have general utility for various types of thermostatic switches, they have particular utility in connection with thermostatic circuit interrupter switches or breakers and the invention herein will be specifically described in connection with such switches or breakers.

FIG. 1 is a perspective view of one form of the thermostatic switch of this invention.

FIG. 2 is an enlarged sectional view through the thermostatic switch taken substantially along the line 2—2 of FIG. 1.

FIGS. 3, 4, 5 and 6 are sectional views through the thermostatic switch illustrating the manner of assembling and calibrating the same.

FIG. 7 is a horizontal sectional view taken substantially along the line 7—7 of FIG. 2.

FIG. 8 is a plan view taken substantially along the line 8—8 of FIG. 3.

FIGS. 9, 10, 11 and 12 are partial elevational views illustrating another form of the thermostatic switch of this invention and showing the various steps in assembling and calibrating the same.

FIG. 13 is a sectional view taken substantially along the line 13—13 of FIG. 10.

FIG. 14 is a sectional view taken substantially along the line 14—14 of FIG. 11.

FIG. 15 is a side elevational view of a further form of the thermostatic switch of this invention.

FIG. 16 is an end elevational view partly in section looking from the right of FIG. 15 substantially along the line 16—16 of FIG. 15.

FIG. 17 is a top plan view of the base of the thermostatic switch of FIG. 15.

FIG. 18 is a side elevational view of the base.

FIG. 19 is a bottom plan view of the cover of the thermostatic switch of FIG. 15.

FIG. 20 is a sectional view taken substantially along the line 20—20 of FIG. 19.

FIG. 21 is an exploded sectional view through the base and cover taken substantially along the lines 21—21 of FIGS. 18 and 20.

FIG. 22 is an exploded sectional view through the base and cover taken substantially along the lines 22—22 of FIGS. 18 and 20.

FIGS. 23 to 25 are vertical sectional views through the thermostatic switch of FIG. 15 showing the various steps in assembling and calibrating the same.

Referring first to FIGS. 1 to 8, one form of the thermostatic switch of this invention is generally designated at 10. It includes an insulating base 11 which is substantially rectangular in shape and which may be formed from any suitable insulating material, such as Bakelite or the like. The base 11 is provided with a pair of openings 12 and 13 therethrough, the openings 12 and 13 being preferably countersunk at the bottom face of the base as indicated at 14 and 15, respectively, in FIGS. 2 and 7. The bottom of the base 11, as illustrated in FIGS. 2 and 7, is provided with a chamber 16 which is connected by passages 17 and 18 to the openings 12 and 13, respectively.

A thermostatic member 20 includes a bimetallic element suitably secured at one end to a post 21 as by welding or the like indicated at 22. The free end of the thermostatic element 20 has a movable contact 23 secured thereto as by welding or the like. The post 21 is also provided with a positioning flange 24 and a screw threaded extension 25 by which the thermostatic switch may be mounted and by which an electrical connection may be made to the post 21. In assembling the post 21 and the bimetallic element 20, the post 21 is first inserted through the opening 12 in the base 11 and then the bimetallic element 20 is welded thereto, this condition being indicated in FIG. 3. The flange 24 rests against the base 11 and, therefore, fixes the position of the post 21 and the bimetallic element 20 with respect to the base 11. It is here noted that the post 21 has a slip fit in the opening 12 so as to provide free movement thereof and a clearance between the post 21 and the opening 12 in the base 11. In assembling the thermostatic switch of this invention, it is preferably assembled in an inverted position as illustrated in FIGS. 3 to 6 and in this inverted position the flange 24 fixes the position of the post 21 in the base 11.

The thermostatic switch also includes a member 28 in the form of a post having a stationary contact 29 on one end thereof, an intermediate flange 30 and a screw threaded portion 31 at the other end thereof, the screw threaded portion 31 also providing means to assist in mounting the thermostatic switch and to make electrical connection to the contact member 28. The contact member 28 is received in the opening 13 in the base 11 with a slip fit so that there is a clearance between the contact member 28 and the opening 13 in the base 11. Thus, the contact member 28 is freely movably mounted in the opening 13. When the contact member 28 is so freely movably mounted and the thermostatic switch is inverted as in FIGS. 3 and 4, the contact member 28 with its stationary contact 29 is urged downwardly by gravity into engagement with the movable contact 23 of the thermostatic member 20, as illustrated in FIG. 4. Thus, the freely movable contact member 28 is caused to engage and follow the movable contact 23 as it may be moved by flexing of the thermostatic member 20.

After the parts are so assembled as illustrated in FIG. 4, a suitable cement 34, such as, an epoxy cement or the like, is applied into the chamber 16 from which it flows through the passages 17 and 18 into the openings 12 and 13 about the post 21 of the thermostatic member 20 and the contact member 28, respectively. The cement is such as not to interfere with the free movement of the contact member 28 in following the movement of the movable contact 23. The countersinkings 14, 15 at the openings 12 and 13 assist in feeding the cement into the openings 12 and 13. In addition to the cement 34 being of a type which does not interfere with the free movement of the contact member 28, it must also be one which will harden after a time interval for fixedly bonding the post 21 and the freely movable contact member 28 in the openings 12 and 13. Epoxy cements are particularly adaptable for this purpose, they including a suitable epoxy resin and suitable curing catalysts. Preferably, the epoxy resin and catalyst are selected so as to cure rapidly at a predetermined temperature, for example, in the range of 250 degrees to 400 degrees F. For example, good results have been obtained by using the epoxy cement of Emerson and Cuming, Inc. including Stycast #2651 MM and Catalysts #9 and #11 and the epoxy cement of Rubber and Asbestos Corporation including Bondmaster #685 and Catalysts CH22 and CH34.

After the parts have been so assembled, as illustrated in FIG. 3, and the cement so applied in inverted position, as illustrated in FIG. 4, the thermostatic switch is placed in inverted position in an oven having an elevated temperature, for example, in the range from 250 degrees to 400 degrees F. As a result of this elevated temperature, as illustrated in FIG. 5, the thermostatic member 20 flexes downwardly and the freely movable contact member 28 automatically follows the movable contact 23 of the thermostatic member. Assume, for example, that a predetermined temperature of 300 degrees F. is maintained in the oven, then the bimetallic element 20 will flex to a predetermined position and the freely movable contact member 28 will be automatically adjusted to a corresponding position, all as illustrated in FIG. 5. After the thermostatic switch has been maintained in the oven for a given period of time at the temperature of say 300 degrees F., the epoxy cement 34 hardens and bonds the post 21 and hence the thermostatic member 20 in its fixed position and bonds the freely movable contact member 28 in its automatically adjusted position. After the bonding takes place by the hardening of the cement, the thermostatic switch is then removed from the oven and is allowed to cool to room temperature. As the thermostatic switch cools, the thermostatic member 20 will stress so as to provide substantial contact pressure between the stationary contact 29 and the movable contact 23. If the thermostatic member 20 is subsequently heated to a temperature value greater than the aforementioned predetermined temperature value of 300 degrees F., the thermostatic member 20 will flex and move the movable contact 23 away from the stationary contact 29, as illustrated in FIG. 6 and break the circuit between the contacts. Thus, the thermostatic switch will open and close the circuit at substantially the predetermined temperature of say 300 degrees F. In this way, the temperature setting of the thermostatic switch is automatically calibrated during the assembly thereof.

When the thermostatic switch is utilized as a circuit interrupter or breaker, the kind and dimensions of the thermostatic member are selected in accordance with the proposed current rating of the circuit interrupter or breaker, and the temperature to which the thermostatic member is heated during assembling and calibrating is selected in accordance with the kind and dimensions of the thermostatic member. For usual current interrupter or breaker purposes the predetermined calibrating temperature, and hence the temperature at which the contacts are opened and closed, should fall within the temperature range of substantially 250 degrees to 400 degrees F.

The form of the thermostatic switch as illustrated in FIGS. 1 to 8 also preferably includes a heater element 36 which is associated with the thermostatic member 20, as by wrapping the same therearound. One end of the heater element 36 is connected by a lead 37 to the thermostatic member 20 at the movable contact 23 and by a lead 38 to the stationary contact 29 of the contact member 28. Thus, the heater 36 is connected in shunt with the contacts 23 and 29. Assume that the thermostatic switch is connected in a circuit to be protected by the screw threaded extensions 25 and 31, the thermostatic member 20 and the contacts 23 and 29 are connected in series in that circuit with the heater 36 shunted out by the engaged contacts 23 and 29. If an overload condition should occur in the circuit, the excess current flow through the thermostatic member 20 will heat the same above the predetermined temperature value so as to separate the movable contact 23 from the stationary contact 29 to open the circuit. When this occurs, however, the current flow in the circuit passes through the heater 36 which in turn operates to heat the thermostatic member 20 and maintain the temperature thereof above the predetermined value so as to maintain the contacts separated. When the overload condition is relieved, the heater element 36 will cool and, hence, so will the thermostatic member 20 so as to reclose the contacts 23 and 29. When the contacts 23 and 29 are closed, the heater 36 is shunted so that it has substantially no heating effect upon the thermostatic member 20.

The base 11 is preferably provided with a marginal flange 40 and side recesses 41 for receiving and positioning a protecting cover 42, preferably of metal, as shown in FIGS. 1, 2 and 7. When the cover 42 is in place on the base 11 as determined by the flange 40, the cover 42 is pressed into the recesses 41, as indicated at 43, for locking the cover in place.

Referring now to FIGS. 9 to 14, another form of thermostatic switch of this invention is generally designated at 50. It includes an insulating base 51 of Bakelite or the like which may have marginal closure flanges 52. A thermostatic member 54 in the form of a bimetallic element is secured at one end to a bracket 55 which in turn is suitably secured in any suitable manner to the base 51. The free end of the thermostatic member 54 carries a movable contact 56 which in turn is engageable with a stationary contact 58 of a stationary contact member 59. The member 59 is freely slidably positioned on the base 51 and it is provided with a pair of fingers 60 which are freely movably received in a pair of openings 61 in the base.

In assembling the thermostatic switch 50, the contact member 59 is placed upon the base 51 with the fingers 60 arranged within the openings 61 and a suitable cement 62, such as, for example, the aforementioned epoxy cement, is applied in the openings 61. The thermostatic switch is then tilted so that the stationary contact 58 of the freely movable contact member 59 engages the movable contact 56 of the thermostatic member 54 by gravity so as to follow the same. The thermostatic switch 50 is then placed in tilted position in an oven and is heated to a predetermined temperature and as this occurs the thermostatic member 54 flexes and the freely movable contact member 59 automatically follows the movable contact 56 of the thermostatic element. After a time interval at the elevated temperature, the epoxy cement 62 hardens to fixedly bond the freely movable stationary contact member 59 in its automatically adjusted position. After bonding has occurred, the thermostatic switch is removed from the oven and allowed to cool and as the thermostatic member 54 cools, it flexes to cause substantial contact pressure between the contacts 56 and 58. When the temperature of the thermostatic member 54 subsequently rises above the predetermined temperature value, the movable contact 56 is separated from the stationary contact 58 to open the circuit between the contacts, as illustrated in FIG. 12. Thus, the manner of assembling and calibrating the thermostatic switch 10 of FIGS. 9 to 14 is substantially the same as those of the thermostatic switch 50 of FIGS. 1 to 8.

Referring now to FIGS. 15 to 26, a further form of the thermostatic switch of this invention is generally designated at 70. It includes an insulating base having a base part 71 and a cover part 72, both of which are formed from a suitable insulating material, such as, Bakelite or the like. The base part 71 includes longitudinally extending side flanges 73 and longitudinally extending upwardly facing ribs 74. One end of the base part 71 is provided with a pad 75 having a flat upper surface and which is provided with a pair of holes 76 and 77. The other end of the base part 71 is provided with a pad 78 having a part of its upper face sloping inwardly and downwardly at an angle of about 15°, and provided with a hole 79. The sides of the pads 75 and 78 are provided with vertically extending grooves 80 and 81, respectively.

The cover part 72 of the base has depending side skirts 85 which are adapted to overlap the ribs 74 and engage the flanges 73 of the base part 71. One end of the cover part 72 is provided with a pad 86 having a flat face which is adapted to overlie a portion of the pad 75 of the base part 71. The pad 86 is provided with a hole or well 87 which overlies the hole 77 in the base part 71. The depending skirts 85 adjacent the pad 86 are provided with ribs 88 which are adapted to be received in the grooves 80 in the pad 75 of the base part 71. The other end of the cover part 72 is provided with a pad 89 which is adapted to overlie the pad 78 of the cover part 71, a portion of the surface of the pad 89 being tapered outwardly and upwardly about 15°. The pad 89 is also provided with a hole or well 90 which overlies the hole 79 in the base part 71. The depending skirts 85 are provided adjacent the pad 89 with a pair of ribs 91 which are adapted to be received in the grooves 81 in the pad 78 of the base part 71.

The cover part 72 is insertable over the base part 71 and is held in proper position with respect thereto by the ribs 88 and 91 cooperating with the grooves 80 and 81. The outer sides of the longitudinal ribs 74 of the base part 71 may be provided with under-cut recesses 93 which receive inwardly extending projections 94 on the depending skirts 85 of the cover part 72 for locking the cover part 72 to the base part 71. When the cover part 72 is so assembled on the base part 71, the holes or wells 87 and 90 in the cover part line up with the holes 77 and 79 in the base part.

The thermostatic switch 70 also includes a contact member 96 arranged between the pads 75 and 86 of the base part 71 and the cover part 72, respectively. The contact member 96 is provided with a hole 97 for communicating the hole 87 with the hole 77. The contact member 96 is fixedly positioned between the pads 75 and 86. The outer end of the contact member 96 is provided with a connector part 98 for making external electrical connections thereto. A stationary contact 99 is suitably secured to the inner end of the contact member 96, as by means of a rivet or the like, the hole 76 in the pad 75 accommodating the rivet head.

A thermostatic member is carried in the other end of the thermostatic switch between the pads 78 and 79 and, in this respect, the thermostatic member includes a bracket 101 interposed between the pads 78 and 89. Because of the tapers on the pads 78 and 89, the bracket 101 is freely movably pivotally carried between the pads. The bracket 101 is provided with a hole 102 for communicating the hole 90 of pad 89 with the hole 79 of pad 78. The outer end of the bracket 101 is provided with a connector portion 103 by which external electrical connection is made thereto. The inner end of the bracket 101 of the thermostatic member has a bimetallic element 104 secured thereto, as by welding or the like. The free end of the bimetallic element 104 carries a movable contact 105, as by means of riveting or the like. The movable contact 105 of the thermostatic member is adapted to engage and disengage the stationary contact 99 of the contact member 96.

In assembling the thermostatic switch 70, the contact member 96 and the bracket 101 of the thermostatic member are placed on the pads 75 and 78 of the base part 71 and then the cover part 72 is placed over the base part 71. The contact member 96 is thus fixedly positioned in the base and the thermostatic member is freely movably pivotally mounted in the base. After the parts are so assembled, as illustrated in FIG. 23, a suitable cement 107, such as, an epoxy cement or the like as discussed above, is applied into the holes or wells 87 and 90, as illustrated in FIG. 24. This epoxy cement, which does not interfere with the free movement of the bracket 101 of the thermostatic member, flows around the stationary contact member 96, around the bracket 101 of the thermostatic member and into the joint between the base part 71 and the cover part 72. The assembled thermostatic switch 70 is then placed in an oven having a desired elevated temperature and, as a result, the bimetallic element 104 flexes, as indicated in FIG. 25, the movable contact 105 maintaining engagement with the stationary contact 99 because of the freely movable positioning of the bracket 101. As a result, the thermostatic member automatically adjusts itself between the pads 78 and 89. After the thermostatic switch is maintained in the oven for the appropriate period of time at the desired temperature, the epoxy cement 107 hardens and bonds the contact member 96 and the bracket 101 of the thermostatic member in their appropriate adjusted positions. Also, the cover part 72 is bonded to the base part 71 to seal the two parts together. After the bonding takes place by the hardening of the cement, the thermostatic switch is then removed from the oven and is allowed to cool to room temperature. As the thermostatic switch cools, the thermostatic member stresses so as to provide substantial contact pressure between the stationary contact 99 and the movable contact 105. If the thermostatic member is subsequently heated to the selected predetermined temperature value, it will flex and move the movable contact 105 away from the stationary contact 99, as illustrated in FIG. 26. Thus, here also, the thermostatic switch will open and close the circuit at substantially said predetermined temperature, and the temperature setting of the thermostatic switch is automatically calibrated during the assembling thereof, as in the cases of the thermostatic switches 10 and 50 discussed above.

While the urging of the freely movably mounted member into engagement with the fixedly mounted member has been shown to be accomplished by gravity in the forms of the invention illustrated in FIGS. 1 to 8, 9 to 14, and 15 to 26, that urging could also be accomplished by spring means or the like with substantially the same results.

While for purposes of illustration several forms of this invention have been disclosed, other forms thereof may

I claim as my invention:

1. The method of assembling and calibrating a thermostatic switch, which includes an insulating base provided with a pair of spaced apart openings therein, a contact member carried by the base in one of the openings and provided with a stationary contact, and a thermostatic member carried by the base in the other opening therein and provided with a movable contact which engages the stationary contact at a predetermined temperature value of the thermostatic element, comprising the steps of, forming a passage in the base which communicates with both openings in the base, mounting one member in fixed position in its opening in the base, mounting the other member in its opening for free movement within the base and urging the same to cause its contact to engage the contact of the said one member while the said other member can still move with respect to its opening, movement of the thermostatic member with temperature variation resulting in bodily movement of said other member in its opening and the change of the relative position between the members while their contacts remain in engagement, selectively applying in the passage and hence in said openings in the base between the base and the said one member and the said other member a fluid, hardenable cement which does not interfere with the free movement of the said other member in its opening in the base and the movement of said thermostatic member under temperature variation even after it has hardened, bringing the thermostatic member to substantially said predetermined temperature for flexing the same and hence correspondingly adjustably positioning the said other member in its opening in the base, and hardening the cement in said passage and said openings at substantially said predetermined temperature for bonding the thermostatic member and the contact member in position in their openings in the base.

2. The method of assembling and calibrating a thermostatic switch, which includes in insulating base provided with a pair of spaced apart openings therein, a contact member carried by the base in one of the openings and provided with a stationary contact, and a thermostatic member carried by the base in the other opening therein and provided with a movable contact normally engaging the stationary contact and adapted to separate the movable contact from the stationary contact upon an increase in temperature of the thermostatic member above a predetermined elevated value, comprising the steps of, forming a passage in the base which communicates with both openings in the base, mounting one member in fixed position in its opening in the base, mounting the other member for free movement within its opening in the base and urging the same to cause its contact to engage the contact of said one member while said other member can still move with respect to its opening, movement of the thermostatic member with temperature variation resulting in bodily movement of said other member in its opening and the change of the relative position between the members while their contacts remain in engagement, applying in the passage and hence in said openings in the base between the base and the said one member and the said other member a fluid, hardenable cement which does not interfere with the free movement of the said other member in its opening in the base and the movement of said thermostatic member under temperature variation even after it has hardened, heating the thermostatic switch to substantially said predetermined elevated temperature for flexing the thermostatic member and hence correspondingly adjustably positioning the said other member in its opening at substantially said predetermined elevated temperature, and hardening said cement for bonding the thermostatic member and the contact member in position in their openings in the base.

References Cited by the Examiner

UNITED STATES PATENTS

| | | | |
|---|---|---|---|
| 2,488,049 | 11/1949 | Bolesky | 200—138.3 |
| 2,614,195 | 10/1952 | Kitto | 200—166 |
| 2,745,924 | 5/1956 | Coates | 200—138.6 |
| 2,785,251 | 3/1957 | Cassidy | 200—168 |
| 2,919,320 | 12/1959 | Edwards et al. | 29—155.5 X |
| 2,944,324 | 7/1960 | Moyer | 29—155.5 |
| 2,962,804 | 12/1960 | Nelson | 29—155.55 |
| 2,968,861 | 1/1961 | Backus | 29—155.55 |
| 3,057,047 | 10/1962 | Zimmer | 200—104 X |

JOHN F. CAMPBELL, *Primary Examiner.*

BERNARD A. GILHEANY, WHITMORE A. WILTZ,
*Examiners.*